United States Patent [19]
Wucherpfennig et al.

[11] 3,865,961
[45] Feb. 11, 1975

[54] ELECTRODIALYZING WINE TO REMOVE SULFUR-CONTAINING COMPOUNDS

[76] Inventors: Karl Wucherpfennig, Riederbergstrasse 81, Wiesbaden; Guenter Wysocki, Hohenfriedbergerstrasse 36, Dortmund, both of Germany

[22] Filed: July 3, 1973

[21] Appl. No.: 376,229

[30] Foreign Application Priority Data
July 10, 1972  Germany.............................. 2233798

[52] U.S. Cl..................................... 426/239, 426/15
[51] Int. Cl................................................ C12g 1/00
[58] Field of Search ....... 426/11, 15, 237, 239, 330, 426/478; 204/180 P

[56] References Cited
UNITED STATES PATENTS

| | | | |
|---|---|---|---|
| 3,165,415 | 1/1965 | Kilburn et al. | 426/239 |
| 3,437,491 | 4/1969 | Peterson et al. | 426/271 |
| 3,498,795 | 3/1970 | Walter | 426/330 |
| 3,544,329 | 12/1970 | Helm et al. | 426/11 |
| 3,687,682 | 8/1972 | Scheder | 204/180 P |

*Primary Examiner*—David M. Naff
*Attorney, Agent, or Firm*—Curtis, Morris & Safford

[57] ABSTRACT

A method for removing free and bound sulfurous acid from wine without substantial demineralization by electrodialysis of said wine at a direct current voltage of at least about 7.5 volts to about 30 volts, preferably against a liquid whose osmotic pressure is substantially the same as that of the wine being electrodialyzed.

1 Claim, 1 Drawing Figure

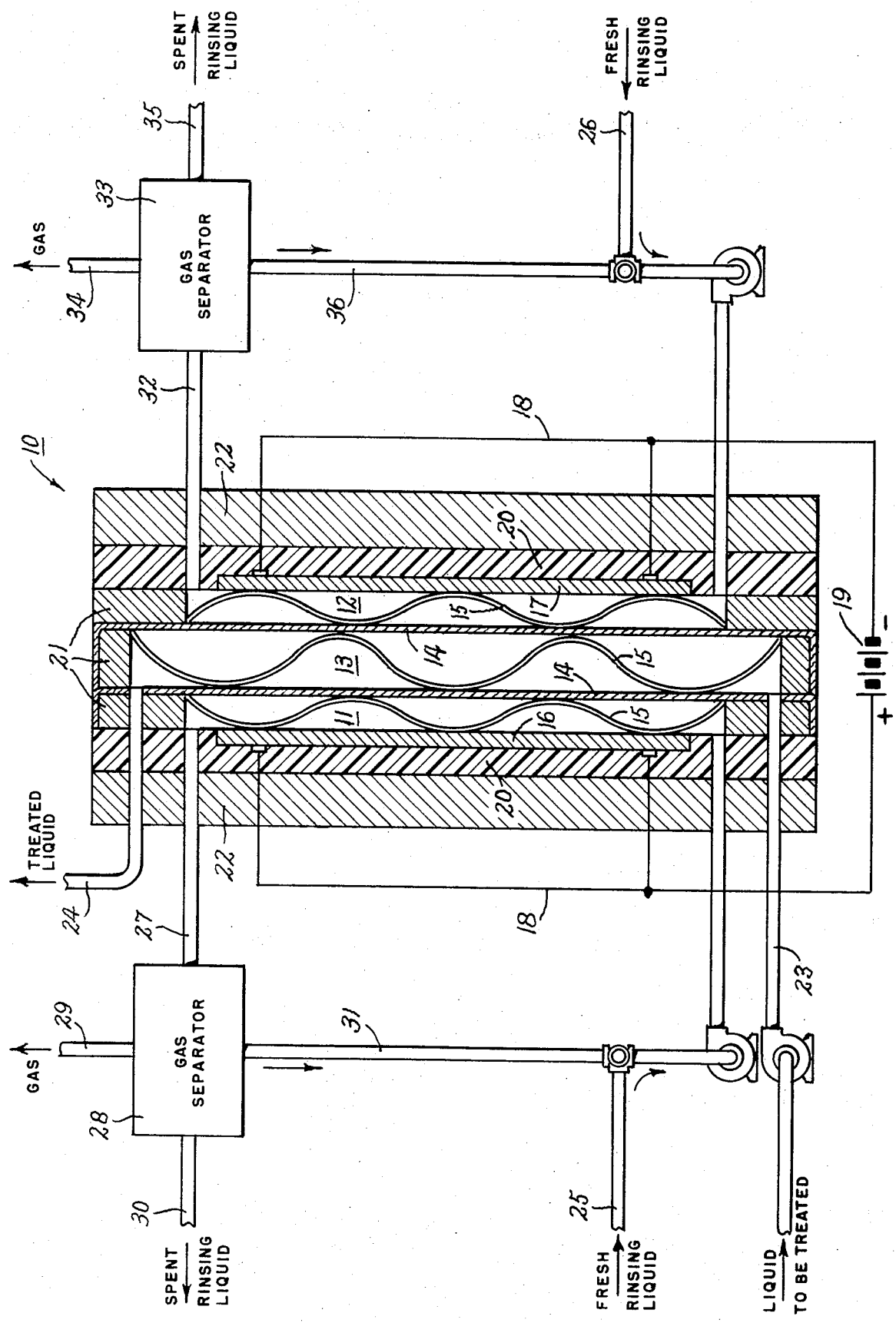

ELECTRODIALYZING WINE TO REMOVE SULFUR-CONTAINING COMPOUNDS

The present invention relates to a method for electrodialyzing wine for the removal of sulfur-containing compounds therefrom, particularly free and chemically-bound sulfurous acid.

It is known in the art that electrodialysis can be employed to remove salt from whey or from sea water or other brackish waters. Electrodialysis has also been employed for the recovery of dissolved catalysts, for the treatment of dilute acids, for the purification of chemical and pharmaceutical products, and for the purification of certain by-products in the sugar industry. However, electrodialysis has not been heretofore employed successfully for the removal of sulfurous compounds from wine.

Sulfur-containing compounds are introduced into wine by the so-called "sulfuring" process, which involves treating the wine with sulfur dioxide, sulfurous acid, or potassium metabisulfite. This treatment is intended to chemically bind acetaldehyde, formed in the wine during the course of fermentation and which, in its unbound state, imparts an unpleasant taste to the wine. Thus, for example, acetaldehyde reacts with sulfurous acid to form ethanol sulfonic acid. Similar bonding between the sulfur compounds, particularly sulfurous acid, occurs with pyroracemic acid (pyruvic acid), ketoglutaric acid, and gluconic acid, all of which may be present in wine as natural products.

For example, a typical wine having a total $SO_2$ content of about 200 mg per liter may contain about 20 mg per liter of free sulfurous acid, the remaining 180 mg being in the form of bound sulfurous acid. Typically, 80 percent of the bound material would be bound to acetaldehyde with the formation of ethanol sulfonic acid, 10 percent may be bound to pyroracemic acid, and another 5 percent each may be bound to materials such as ketoglutaric acid and gluconic acid.

In the stomach, the sulfur-containing compounds present in the wine are cleaved: thus, for example, ethanol sulfonic acid again forms acetaldehyde and sulfurous acid.

For health reasons, it is undesirable that wine contain free or bound sulfurous acid. Tests on animals have shown, for example, that 40 mg of sulfite per kg of body weight per day have a toxic effect in sub-chronic tests. The toxic effect of sulfurous acid has also been confirmed in humans. Quantities of up to only 40 mg of sulfur dioxide per person per day are, however, regarded as unobjectionable at present.

For these reasons, efforts have heretofore been made to keep the total amount of sulfurous acid, in free or bound form, in wine to as low a level as possible. In wines, such compounds may be present in an amount of up to 300 mg per liter. The maintenance of a low sulfurous acid content in wine is particularly desirable because, by statistical evaluation, wine is the food or beverage product which contains the highest quantities of sulfurous acid.

Heretofore, all attempts in the processing of wine aiming at a replacement of sulfurous acid by other compounds have failed. It is not possible to suppress the formation of acetalydehyde during fermentation, nor is it possible to use other substances having a reducing action, for example ascorbic acid, for removal of the acetalydehyde.

According to the present invention, it has been found that the content of free or bound sulfurous acid in wine can be substantially reduced in a simple manner by subjecting the wine to electrodialysis at direct current voltages of at least about 7.5 volts to about 30 volts.

An apparatus suitable for carrying out the process according to the present invention is shown in the accompanying drawing wherein the Figure shows electrodialysis apparatus 10 comprising anode compartment 11, cathode compartment 12, and dialysis compartment 13 separated one from another by semi-permeable membranes 14. Within compartments 11, 12, and 13 the membranes 14 are suitably spaced and supported by spacer elements 15 suitably made of a non-toxic material, for example a synthetic resinous material such as polyethylene, polypropylene, a polyamide, or the like.

Defining one wall of anode compartment 11 is anode 16; cathode 17 defines one wall of cathode compartment 12. The electrodes are contained within electrode support means 20, for example made of a non-toxic synthetic resin in which the electrodes are embedded. The electrodes themselves are of non-toxic electrically conductive material, usually metal, for example from technically pure silver, from platinum, from platinum-plated titanium, or from platinum-plated stainless steel. The electrodes are connected by electrically conductive wiring 18 to direct current source 19.

Compartments 11 – 13 are further defined within the apparatus 10 by frame elements 21 which support the semi-permeable membranes 14 at their edges. The frames are held together by pressure plates 22, which may be made of metal such as mild steel or stainless steel.

Wine to be treated according to the present invention is introduced into dialysis compartment 13 through line 23 containing pump means and emerges from dialysis compartment 13 through line 24. Fresh rinse fluid against which the wine is to be anodically electrodialyzed is introduced into anode compartment 11 through line 25, while the rinse liquid against which the wine to be treated is to be cathodically electrodialyzed is introduced into cathode compartment 12 through line 26.

Line 27 emerging from anode compartment 11 passes to gas separator 28 from which gas ($O_2$) generated at the anode is removed through line 29. By valve means not shown in the FIGURE, spent anodic rinse fluid can be removed from the gas separator in whole or in part through line 30 or can be introduced into line 31 in whole or in part for recycling into anode compartment 11.

Analogously, the cathodic rinse fluid emerging from cathode compartment 12 through line 32 passes into gas separator 33 wherein gas ($H_2$) generated at the cathode is removed through line 34. Again, the spent cathodic rinse liquid can be removed in whole or in part through line 35 or can be recycled in whole or in part to cathode compartment 12 through line 36.

If, in an apparatus such as shown in the drawings, relatively low voltages are applied between electrodes 16 and 17, for example voltages in the range of 2.5 to less than 7.5 volts, a relatively large number of ions migrate to the electrodes where they are discharged. The number of discharged ions is, however, by no means proportional to the flow of current or current intensity. Apparently, the higher the voltage chosen within this range, the fewer ions migrate to the electrodes because part of the current is transformed to heat.

In this way, it is possible to remove fairly large quantities of sulfur-containing compounds such as free or bound sulfurous acid from wine. However, at the same time the wine is demineralized and if demineralization occurs to too great an extent the wine is completely altered. If sulfur-containing compounds such as ethanol sulfonic acid were more or less completely removed from wine under these conditions, the wine would simultaneously be demineralized to such a degree that the wine would lose its typical desirable properties.

According to the present invention, it has been found that a too-great demineralization of electrodialyzed wine can be avoided by electrodialyzing the wine at relatively high voltages, i.e., from at least about 7.5 volts to about 30 volts. Using such voltages, free and bound sulfurous acid, for example in the form of ions of ethanol sulfonic acid [$H_3CCH(OH)OSO_2^-$], migrate preferentially to anode compartment 11 while potassium ions (the cations principally found naturally in wine) migrate to cathode compartment 12. Other anions and cations present in the wine migrate to such a small extent that the properties of the wine remain substantially unchanged.

In this way, it is possible to reduce the content of sulfur-containing compounds in wine to an extent that the wine is made more healthful without substantial change in its chemical composition or properties regarding taste.

In principle, any non-toxic liquid can be employed as the anodic or cathodic rinse liquid against which wine can be electrodialyzed according to the present process. For example, wine having a lower content of sulfur compounds than the wine being dialyzed can be employed. Aqueous solutions of ethanol, aqueous solutions of sugar, or aqueous solutions of non-toxic salts such as sodium chloride can be employed. Even pure water can be used, though this may result in a slight dilution of the wine being treated.

In a preferred embodiment, the osmotic pressure of the rinse liquid employed preferably has substantially the same osmotic pressure of the wine being treated. In general, depending on the nature of the wine, the osmotic pressure of wine is between about 35 and 55 atmospheres. Rinse liquids having osmotic pressures within this range can be readily prepared by one skilled in the art. Thus, aqueous solutions containing from about 60 to about 100 g per liter of ethanol have osmotic pressues in this range, as do aqueous solutions containing about 3,500 ppm of sodium chloride.

The semi-permeable membranes 14 employed in an apparatus such as that shown in the accompanying FIGURE should, evidently, be non-toxic materials and are suitably non-toxic synthetic polymers or resins. The membranes, for example, may comprise a polyolefin such as polyethylene or polypropylene, chlorinated polyolefins such as chlorinated polyethylene, various polyamides (e.g., nylons), or polysaccharide polymers such as cellulose acetate or cellulose ethyl esters.

A better understanding of the present invention and of its many advantages will be had by referring to the following example given by way of illustration.

EXAMPLE

A wine having a total $SO_2$ content of 118 mg per liter, of which 15 mg per liter are free $SO_2$ (in the form of sulfurous acid) is subjected to electrodialysis in an apparatus of the type shown in the FIGURE comprising two semi-permeable membranes 14 each having an area of 100 cm². Electrodes 16 and 17 are also of the size, i.e., 100 cm².

In a first run, a direct current voltage of 7.5 volts is applied to the electrodes and two liters of winw are run through the apparatus per hour. A 10 percent aqueous solution of ethanol, which has about the same osmotic pressure as the wine being treated, is employed as the rinse liquid in both anode and cathode compartments 11, 12. As a result of the treatment, the total $SO_2$ content of the treated wine is reduced by 33 mg per liter, and the free $SO_2$ is reduced by 5 mg per liter.

Similar results are obtained using an aqueous solution containing 40 – 80 grams per liter if sodium chloride as the rinse liquid in the anode and cathode compartments.

In a second run, a voltage of 12 volts is applied to the electrodes and fresh, untreated, wine is treated as described above. In this case, the total $SO_2$ content is reduced by 45 mg per liter and the free $SO_2$ by 7 mg per liter. Thus, at a higher voltage, more free or bound $SO_2$ (principally ethanol sulfonic acid) is removed.

The run is reprated a third time on fresh, untreated winw of the kind described with the application of a direct current voltage of 30 volts. In this case, the total $SO_2$ content is reduced by 67 mg per liter and the free $SO_2$ by 8 mg per liter.

These results are summarized below in Table I which illustrates that, with increasing voltage, both the content of free $SO_2$ as well as the content of bound $SO_2$ (principally ethanol sulfonic acid) are removed in an increased degree.

TABLE I

| Voltage Applied | $SO_2$ Content of Wine after Treatment (mg/l) | | | Reduction in $SO_2$ Content (%) | | |
|---|---|---|---|---|---|---|
| | Total | Free | Bound | Total | Free | Bound |
| 7.5 | 85 | 10 | 75 | 28 | 33 | 27 |
| 12 | 73 | 8 | 65 | 38 | 47 | 37 |
| 30 | 51 | 7 | 44 | 57 | 54 | 57 |

What is claimed is:

1. A method for removing substantial quantities of free and bound sulfurous acid from wine without substantial demineralization thereof, which process comprises electrodialyzing said wine at a direct current voltage of about 7.5 volts to about 30 volts between an anode and a cathode through a first membrane permeable to cations and a second membrane permeable to free and bound sulfurous acid ions, in each case against a rinsing liquid present on the side of said membranes opposite said wine and having an osmotic pressure substantially equal to that of the wine being electrodialyzed, whereby cations pass from the wine toward the cathode through said first membrane into rinsing liquid surrounding the cathode and free and bound sulfurous acid ion pass from the wine toward the anode through said second membrane into rinsing liquid surrounding the anode.

* * * * *